United States Patent [19]

Pautz et al.

[11] Patent Number: 4,941,728
[45] Date of Patent: Jul. 17, 1990

[54] OPTICAL FIBER PLUG-IN CONNECTION HAVING A RADIALLY ELASTICALLY SUPPORTED PLUG PIN

[75] Inventors: Anton Pautz, Munich; Manfred Lang, Taufkirchen, both of Fed. Rep. of Germany

[73] Assignee: Spinner GmbH, Elektrotechnische Fabrik, Munich, Fed. Rep. of Germany

[21] Appl. No.: 151,926

[22] Filed: Feb. 3, 1988

[30] Foreign Application Priority Data

Feb. 10, 1987 [DE] Fed. Rep. of Germany ....... 3704070

[51] Int. Cl.$^5$ ................................................ G02B 6/38
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 4,223,978 | 9/1980 | Kummer et al. | 350/96.20 |
| 4,445,753 | 5/1984 | Collignon | 350/96.21 |
| 4,458,983 | 7/1984 | Roberts | 350/96.20 |
| 4,526,438 | 7/1985 | Essert | 350/96.20 |
| 4,611,887 | 9/1986 | Glover et al. | 350/96.21 |
| 4,687,292 | 8/1987 | Krausse | 350/96.21 |
| 4,707,072 | 11/1987 | Kraakman | 350/96.21 |
| 4,726,647 | 2/1988 | Kakii et al. | 350/96.21 |

FOREIGN PATENT DOCUMENTS 8221983 5/1983 Fed. Rep. of Germany ... 350/96.21

Primary Examiner—Frank Gonzalez
Attorney, Agent, or Firm—Henry M. Feiereisen

[57] ABSTRACT

An optical fiber plug-in connection includes a coupler with a coupler centering sleeve, a coupler sleeve centrally retained within the coupler centering sleeve and a fiber containing coupler pin accommodated in the coupler sleeve. The coupler cooperates with a plug which includes a plug centering sleeve insertable in the coupler centering sleeve, a cable clamp supported in the plug centering sleeve, and a fiber containing plug pin which is radially elastically supported relative to the plug centering sleeve.

6 Claims, 2 Drawing Sheets

OPTICAL FIBER PLUG-IN CONNECTION HAVING A RADIALLY ELASTICALLY SUPPORTED PLUG PIN

BACKGROUND OF THE INVENTION

The present invention refers to a plug-in connection for joining optical fibers or optical waveguides.

In known optical fiber plug-in connections, the tolerances of some precision parts must be less than one micrometer in order to attain low attenuation values. Since in some instances the couplers are disposed in a frame plate and the plugs are located at the rear of a plug-in housing, an axial misalignment and an angular deviation between plug and coupler may occur upon making the plug-in connection for tolerance reasons or due to cable weight and stress forces acting on the cable. In view of their high precision, known plug-in connections allow a compensation of these tolerances only at very small positional deviations. However, a considerably wider tolerance range would be desirable e.g. axial misalignment of up to a few millimeters as well as angular deviations of up to a few degrees between the coupler axis and the plug axis.

An optical fiber plug-in connection of this type is e.g. shown in FIGS. 1 to 3 in which a plug pin 1 is rigidly connected with the respective cable clamp 7 and is insertable in a coupler for connection with a coupler pin 1'. The plug pin 1 and the coupler pin 1' contain a respective optical fiber end and are positioned to each other by a coupler sleeve 2 in such a manner that the fiber ends meet to a sufficient degree. Since optical losses of substantial magnitude are encountered in a monomode fiber upon a misalignment of less than one micrometer, the play between the coupler sleeve 2 and the pins 1, 1' should not exceed about half a micrometer.

FIG. 2 depicts the position of the plug relative to the coupler during the plug-in connection. In order to be able to insert the plug pin 1 into the coupler sleeve 2, the respective axes A and B should be aligned as accurately as possible. This is achieved by providing the plug with a centering sleeve 3 which surrounds the plug pin 1, and by providing the coupler with a centering sleeve 4 in which the coupler sleeve 2 is centrally supported. The play between the centering sleeves 3, 4 is of such magnitude that the admissible mounting angle of e.g. 1 degree between the respective mounting sheets 5, 6 is compensated during the plug-in connection. Consequently, there is still a slight misalignment when the plug pin 1 is about to penetrate into the coupler sleeve 2. This misalignment is compensated by floatingly supporting the cable clamp 7 within the centering sleeve 3 and in the plug housing, respectively, the latter not being shown in detail. This play is sufficient to align the plug pin 1 at small lateral misalignment and slight angular differences so as to be able to slide into the coupler sleeve 2. However, as shown in FIG. 3, at greater misalignment, especially at greater angular deviations, a jamming or self-locking occurs.

SUMMARY OF THE INVENTION

It is thus an object of the present invention to provide an improved optical fiber plug-in connection obviating the afore-stated drawbacks.

This object and others which will become apparent hereinafter are attained in accordance with the present invention by radially elastically supporting the plug pin relative to the plug centering sleeve.

Through the provision of a flexible plug pin, the connection thereof with the coupler is attained in a secure and simple manner without any damage and by maintaining a low optical attenuation even at considerable axial misalignment or angular deviations of a magnitude as afore-stated. Despite the wide mechanical connecting range between the plug and the coupler, there is no need to increase the narrow tolerances required especially between the plug pin and the coupler sleeve for achieving a low optical attenuation.

The radial elastic support of the plug pin is preferably attained by a flexible tube which connects the plug pin to the cable clamp and contains the optical fiber. The tube may be made of any suitable material of sufficient modulus of elasticity.

BRIEF DESCRIPTION OF THE DRAWING

The above and other objects, features and advantages of the present invention will now be described in more detail with reference to the accompanying drawing in which.

DESCRIPTION OF PREFERRED EMBODIMENTS

Figure 1:
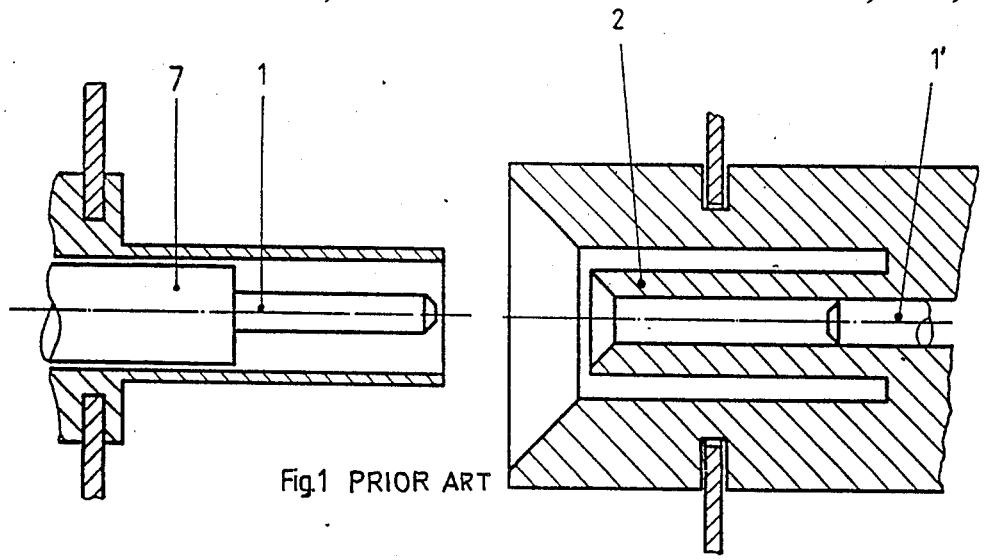
FIG. 1 shows a cross sectional view of a conventional plug-in connection with the plug and coupler disengaged from each other.
Figure 2:
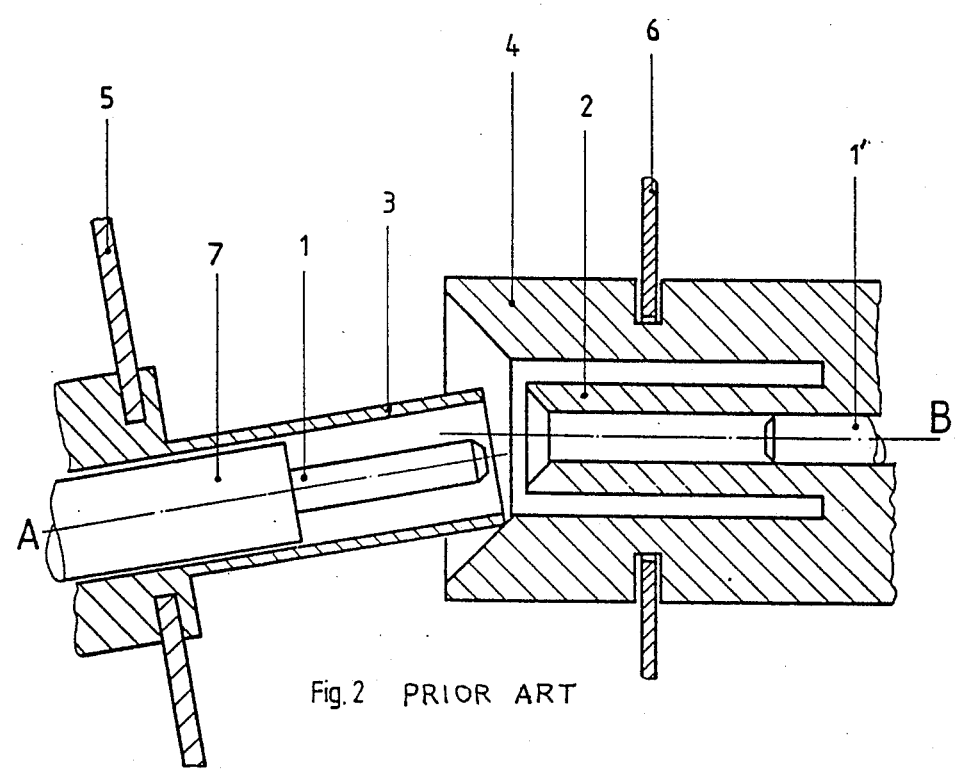
FIG. 2 shows a cross sectional view of the conventional plug-in connection of FIG. 1 with the plug about to be inserted in the coupler.
Figure 3:
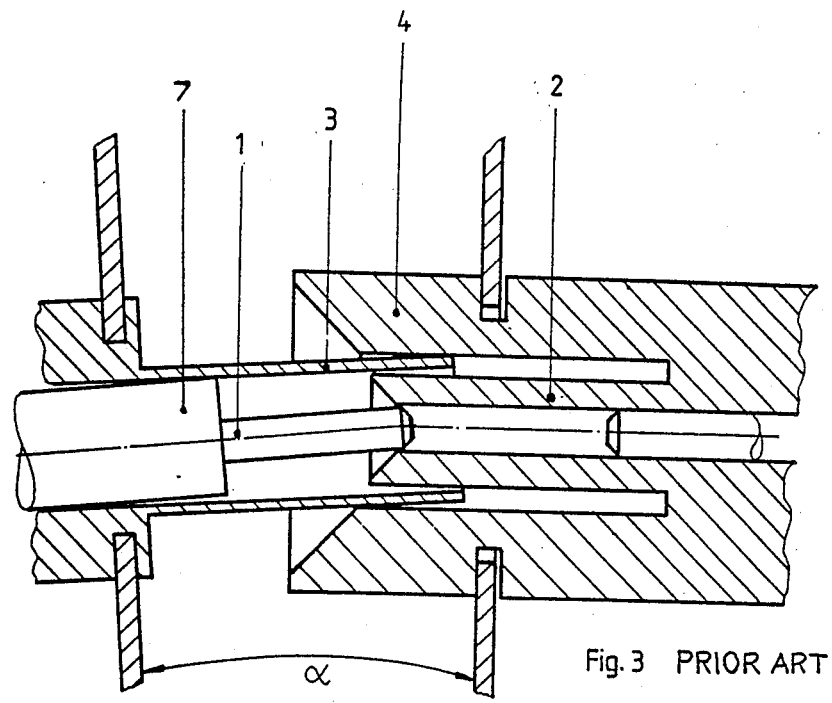
FIG. 3 shows a cross sectional view of the conventional plug-in connection of FIG. 1 with the plug jammed in the coupler.
Figure 4:
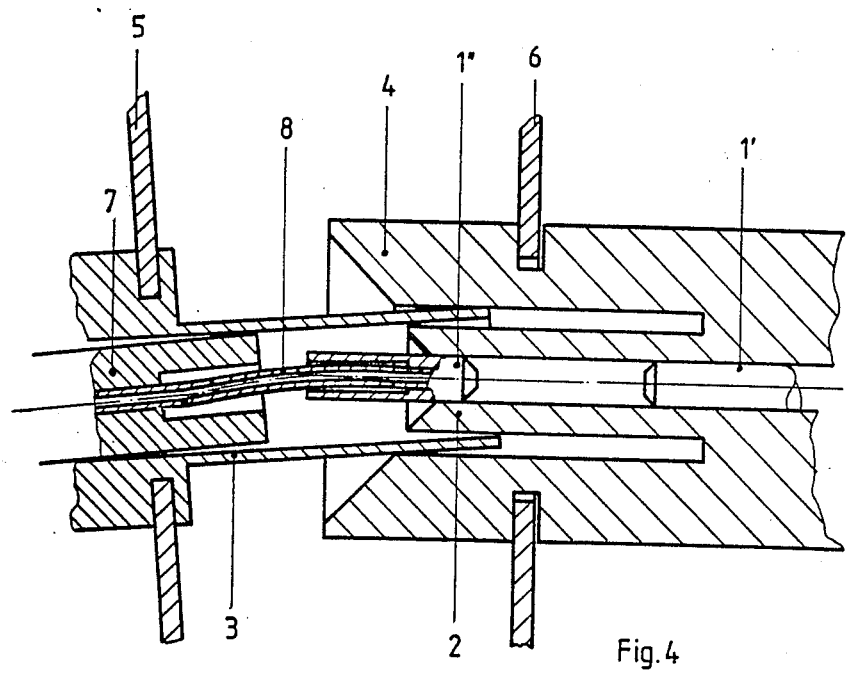
FIG. 4 shows a cross sectional view of one embodiment of a plug-in connection in accordance with the present invention.

Detailed description will hereunder be given of one embodiment of the present invention with reference to FIG. 4 which illustrates a cross sectional view of an optical fiber plug-in connection in accordance with the present invention. The plug-in connection includes a coupler with a coupler sleeve 2 centrally supported in a centering sleeve 4 and having a central bore in which the coupler pin 1 is disposed. Extending between the coupler sleeve 2 and the surrounding centering sleeve 4 is a recess 9 in which the centering sleeve 3 of the plug may slide. Floatingly supported in the sleeve 3 is the cable clamp 7 which receives one end of a flexible tube 8 of suitable modulus of elasticity. The tube 8 may be made e.g. of steel or of a suitable plastic material as e.g. carbon fiber composite materials and guides in its interior the optical fiber. At its other end remote to the cable clamp 7, the tube 8 is surrounded by the plug pin 1" and fixedly connected thereto.

The plug pin 1" is thus connected to the cable clamp 7 via the flexible tube 8 and is movably retained within the centering sleeve 3 of the plug in such a manner that a rotation about a fictitious point defined in the interior of the plug pin 1" is possible. The rotational motion and the tilting motion of the plug pin 1" is attained by the interaction of the indicated centering surfaces at the end face of the plug pin 1", on the one hand, and at the end face of the coupler sleeve 2, on the other hand.

The plug pin 1" can easily adjust to the position of the coupler sleeve 2 in view of the elasticity of the tube 8. The forces required for aligning the plug pin 1" decrease the closer the joint between the tube 8 and the plug pin 1" is located toward the end face of the plug pin 1".

It will be readily recognized that the embodiment of the present invention as illustrated in FIG. 4 is made only by way of example, and thus, any other suitable radially elastic support of the plug pin 1" relative to the centering sleeve 3 should be considered within the scope of the present invention. The flexible tube 8 may be of any suitable material, or may be constituted by a jacket of the fiber. It is even possible to omit the tube 8 altogether in case the optical fiber is of sufficient thickness and elasticity.

According to tests with an optical fiber plug-in connection in accordance with the present invention, the plug could easily be inserted into the coupler at an axial misalignment of 4 millimeters and a simultaneous angular deviation of 4 degrees. These tests were conducted with monomode plug-in connectors with a tolerance between the plug pin and the coupler sleeve of about half a micrometer.

While the invention has been illustrated and described as embodied in an Optical Fiber Plug-In Connection, it is not intended to be limited to the details shown since various modifications and structural changes may be made without departing in any way from the spirit of the present invention.

What is claimed as new and desired to be protected by Letters Patent is set forth in the appended claims:

We claim:

1. An optical fiber plug-in connection, comprising:
    a coupler including a coupler centering sleeve, a coupler sleeve centrally retained within said coupler centering sleeve and a fiber containing coupler pin accommodated in said coupler sleeve;
    a plug including a plug centering sleeve insertable in said coupler centering sleeve, a cable clamp supported in said plug centering sleeve, and a fiber containing plug pin; and
    support means for radially elastically supporting said plug pin relative to said cable clamp, said support means including a flexible tube enclosing said fiber and connecting said plug pin with said cable clamp.

2. A plug-in connection as defined in claim 1 wherein said tube is made of plastic material.

3. A plug-in connection as defined in claim 1 wherein said tube is constituted by a jacket of the fiber.

4. A plug-in connection as defined in claim 1 wherein said cable clamp is floatingly supported in said plug centering sleeve.

5. An optical fiber plug-in connection, comprising:
    a coupler including a coupler centering sleeve, a coupler sleeve centrally retained within said coupler centering sleeve and a fiber containing coupler pin accommodated in said coupler sleeve; and
    a plug including a plug centering sleeve insertable in said coupler centering sleeve, a cable clamp supported in said plug centering sleeve, and a fiber containing plug pin, said fiber of said plug pin connecting said plug pin with said cable clamp for radially elastically supporting said plug pin relative to said cable clamp.

6. An optical fiber plug-in connection, comprising:
    a coupler including a fiber containing coupler pin;
    a plug including a fiber containing plug pin insertable in said coupler for connection with said coupler pin; and
    support means for freely and radially elastically supporting said plug pin relative to said plug, said support means including a flexible tube enclosing said fiber and connecting said plug pin to said plug.

* * * * *